United States Patent
Boyd et al.

(10) Patent No.: US 12,416,525 B2
(45) Date of Patent: Sep. 16, 2025

(54) OPTICAL BENCH FOR SPECTROSCOPY

(71) Applicant: Vector Atomic, Inc., Pleasanton, CA (US)

(72) Inventors: Martin Machai Boyd, Pleasanton, CA (US); Micah Perry Ledbetter, Sunnyvale, CA (US); William Lunden, Dublin, CA (US); Guthrie Bran Partridge, Sunnyvale, CA (US); Jonathan David Roslund, Pleasanton, CA (US); Daniel Sheredy, Castro Valley, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 286 days.

(21) Appl. No.: 18/296,818

(22) Filed: Apr. 6, 2023

(65) Prior Publication Data
US 2024/0337534 A1    Oct. 10, 2024

(51) Int. Cl.
*G01J 3/447* (2006.01)
*G01J 3/433* (2006.01)
(Continued)

(52) U.S. Cl.
CPC ........... *G01J 3/4406* (2013.01); *G01J 3/4338* (2013.01); *G01J 3/447* (2013.01);
(Continued)

(58) Field of Classification Search
CPC ........ G01J 3/4406; G01J 3/4338; G01J 3/447; G01J 2003/1252; G01J 2003/423; G01J 2003/4334
See application file for complete search history.

(56) References Cited

U.S. PATENT DOCUMENTS 8,712,198 B2     4/2014   Bicknell et al.
11,843,420 B1 *  12/2023  Caliga ................... H04B 10/70
(Continued)

FOREIGN PATENT DOCUMENTS

WO    2011023765 A1    3/2011

OTHER PUBLICATIONS

Wideband laser locking to an atomic reference with modulation transfer spectroscopy, School of Physics, Monash University, vol. 21, No. 3/Optics Express, pp. 3103-3113 (Year: 2013).*
European Patent Office, Extended European Search Report for European Patent Application No. 24168687.2, dated Aug. 1, 2024.
Negnevitsky et al., Wideband laser locking to an atomic reference with modulation transfer spectroscopy, Optics Express, vol. 21, No. 3, Feb. 11, 2013.
(Continued)

*Primary Examiner* — David P Porta
*Assistant Examiner* — Fani Polyzos Boosalis
(74) *Attorney, Agent, or Firm* — Patterson + Sheridan, LLP (57) ABSTRACT

Embodiments herein describe various arrangements of an optical bench used to perform spectroscopy. For example, a spectroscopy system may include a pump optical signal and a probe optical signal that are transmitted through a vapor cell on the optical bench. The optical bench can further include one or more optical components (e.g., beam splitter and a thin film polarizer) for redirecting a portion of the probe and pump optical signals to photodiodes. In one embodiment, the measurements obtained from the photodiodes can be used to perform multiple tasks. For example, the measurements can be used to adjust the power of the optical signals in the optical bench (e.g., make DC power adjustments), perform amplitude modulation correction, and lock a laser frequency to a peak of an absorption spectrum of the vapor in the vapor cell.

23 Claims, 8 Drawing Sheets

(51) Int. Cl.
*G01J 3/44* (2006.01)
*G01J 3/12* (2006.01)
*G01J 3/42* (2006.01)

(52) U.S. Cl.
CPC . *G01J 2003/1252* (2013.01); *G01J 2003/423* (2013.01); *G01J 2003/4334* (2013.01)

(56) References Cited

U.S. PATENT DOCUMENTS

| | | | |
|---|---|---|---|
| 11,913,835 B1* | 2/2024 | Ledbetter | G04F 5/14 |
| 2016/0084757 A1* | 3/2016 | Miron | G01N 21/031 |
| | | | 356/437 |

OTHER PUBLICATIONS

Du Burck et al., Narrow band noise rejection technique for laser frequency and length standards: application to frequency stabilization to I2 lines near dissociation limit at 501.7 nm, Metrologia 46 (2009) 599-606.

Doringshoff, K., Schuldt, T., Kovalchuk, E. V., Stühler, J., Braxmaier, C., & Peters, A. (2017). A flight-like absolute optical frequency reference based on iodine for laser systems at 1064 nm. Applied Physics B, 123(6), Dated: Jun. 1, 2017, 1-8.

Schuldt, T., Döringshoff, K., Kovalchuk, E. V., Keetman, A., Pahl, J., Peters, A., & Braxmaier, C. (2017). Development of a compact optical absolute frequency reference for space with 10-15 instability. Applied optics, 56(4), Dated: Jan. 31, 2017, pp. 1101-1106.

* cited by examiner

OPTICAL BENCH FOR SPECTROSCOPY

STATEMENT OF GOVERNMENT INTEREST

This invention was made with government support under Contract No: N00014-22-C-1041 awarded by the Office of Naval Research. The government has certain rights in the invention.

BACKGROUND

Field

Embodiments of the present invention generally relate to an optical bench with photodiodes that measure power and modulation components of optical spectroscopy signals.

Description of the Related Art

Optical atomic clocks offer improved frequency instabilities compared to microwave frequency standards due to the higher quality factor Q associated with an optical resonance. To take advantage of these high quality factors, a coherent interaction between the light and matter is required. One barrier to the widespread deployment of optical frequency standards is the complexity and cost associated with optical setups for performing spectroscopy using a vapor cell. Specifically, a typical optical bench for performing spectroscopy includes a large number of custom (and expensive) optics, polarizers, and photodiodes. Further, these optics must be stable since beam misalignment impacts the accuracy of the clock.

SUMMARY

One embodiment described herein is a spectroscopy system that includes a vapor cell configured to receive a probe optical signal and a pump optical signal where optical paths of the probe and pump optical signal in the vapor cell at least partially overlap, a first photodiode configured to receive a portion of the pump optical signal before passing through the vapor cell, a second photodiode configured to at least one of (i) receive a portion of the probe optical signal after passing through the vapor cell or (ii) detect a fluorescence of the vapor cell, and a control system that is configured to perform amplitude correction and power adjustment on the pump optical signal using measurements obtained from the first photodiode and perform power adjustment on the probe optical signal and laser locking using measurements obtained from the second photodiode.

Another embodiment described herein is a spectroscopy system that includes a vapor cell configured to receive a probe optical signal and a pump optical signal where optical paths of the probe and pump optical signal in the vapor cell at least partially overlap, a first photodiode configured to receive a portion of the pump optical signal before passing through the vapor cell, a second photodiode configured to at least one of (i) receive a first portion of the probe optical signal after passing through the vapor cell or (ii) detect a fluorescence of the vapor cell, a third photodiode configured to receive a second portion of the probe optical signal before passing through the vapor cell, and a control system. The control system is configured to perform amplitude correction and power adjustment on the pump optical signal using measurements obtained from the first photodiode, perform laser locking using measurements obtained from the second photodiode, and reduce noise on the probe optical signal using measurements obtained from the third photodiode.

Another embodiment described herein is a method that includes measuring a first optical signal using a first photodiode before the first optical signal has passed through a vapor cell, performing amplitude modulation correction and power adjustment on the first optical signal using measurements obtained from the first photodiode, at least one of (i) measuring a second optical signal or (ii) detecting a fluorescence of the vapor cell using a second photodiode after the second optical signal has passed through the vapor cell, and performing power adjustment on the second optical signal and laser locking using measurements obtained from the second photodiode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe various arrangements of an optical bench used to perform spectroscopy. For example, a spectroscopy system may include a pump optical signal and a probe optical signal that are transmitted through a vapor cell (also referred to as a gas cell) on the optical bench. The optical bench can further include one or more optical components (e.g., beam splitter and a thin film polarizer) for redirecting a portion of the probe and pump optical signals to photodiodes. In one embodiment, the measurements obtained from the photodiodes can be used to perform multiple tasks. For example, the measurements can be used to adjust the power of the optical signals in the optical bench (e.g., make power adjustments), perform amplitude modulation correction, and perform laser frequency stabilization to lock the laser frequency to a peak of an absorption spectrum of the vapor in the vapor cell. Thus, while other implementations rely on three, four, or more photodiodes and complicated optical arrangements, the embodiments herein can obtain the required measurements using only two photodiodes and with a simplified optical arrangement in the optical bench (although some embodiments can use more than two photodiodes such as the embodiment in FIG. 7).

Figure 1:
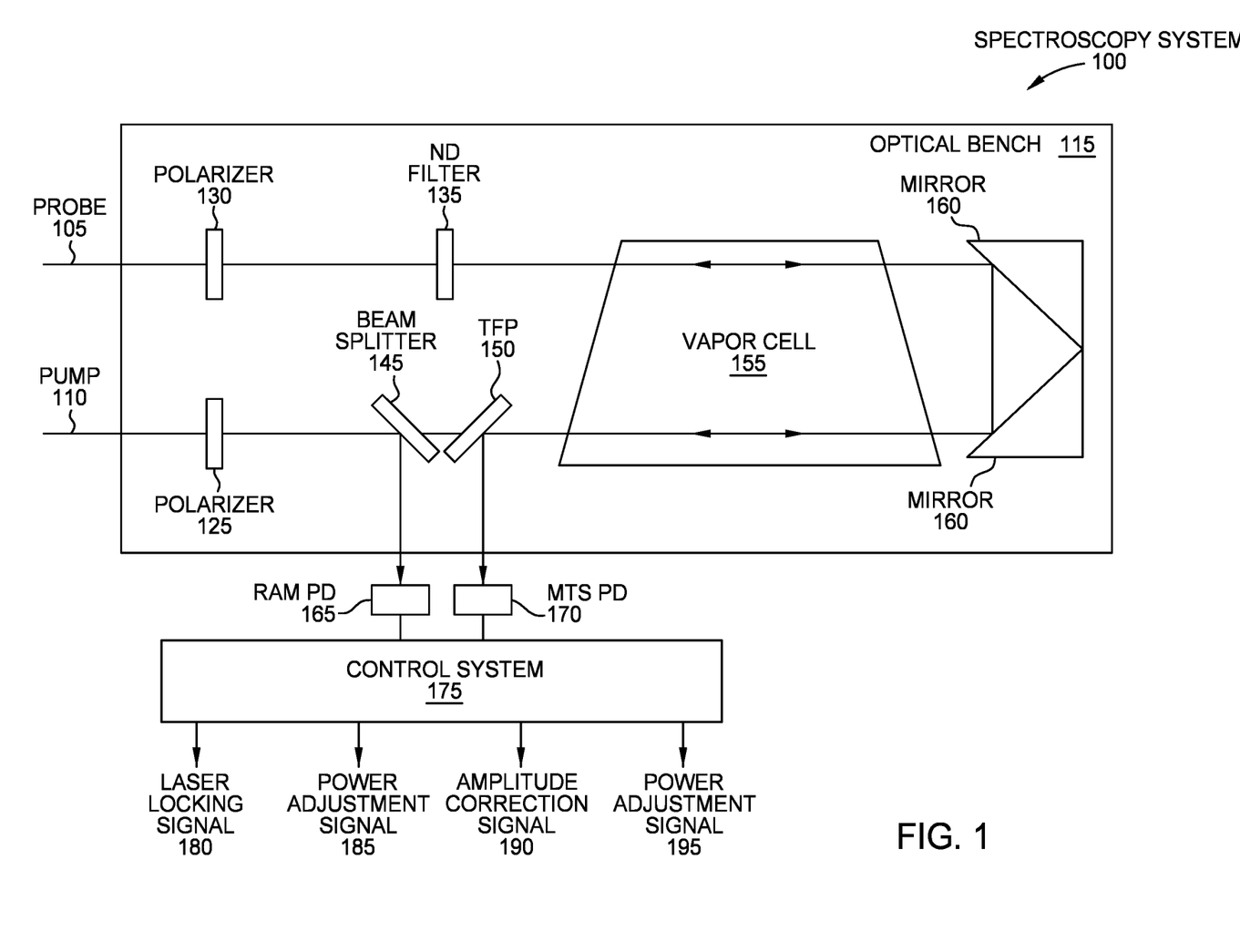
FIG. 1 illustrates a spectroscopy system with an optical bench, according to one embodiment described herein.

FIG. 1 illustrates a spectroscopy system 100 with an optical bench 115, according to one embodiment described herein. In this example, the optical bench 115 receives a probe optical signal 105 and a pump optical signal 110. In one embodiment, the probe optical signal 105 is an unmodulated optical signal while the pump optical signal 110 has already been modulated. That is, the pump optical signal 110 may have first passed through an optical modulator before being received by the optical bench 115 while the probe optical signal 105 has not. In one embodiment, the probe and pump optical signals 105, 110 are generated by the same laser source (where the laser is split to form the two optical signals, and the pump optical signal 110 is separately modulated). Alternatively, the probe and pump optical signals 105, 110 can be generated using separate laser sources.

In one embodiment, the probe and pump optical signals 105, 110 are transmitted on fiber optic cables before reaching the optical bench 115 which then transmits these signals in free space. As shown, the probe optical signal 105 passes through an additional polarizer 130 which establishes fixed polarization for the optical system to reduce polarization errors in a thin film polarizer 150. In any case, the polarizer 130 is optional and can be omitted from the system 100.

The probe optical signal 105 then travels through a vapor cell 155. In this embodiment, the mirrors 160 redirect the probe optical signal so that it passes through the vapor cell 155 twice. However, this is just one example. In another embodiments, the probe optical signal 105 can pass through the vapor cell 155 only once, or more than two times by adding additional mirrors.

After passing through a polarizer 125, a beam splitter 145 redirects a portion of the pump optical signal 110 to a residual amplitude modulation (RAM) photodiode (PD) 165, which will be discussed later. In one embodiment the beam splitter 145 is non-polarizing to reduce polarization sensitivity of the photodiode measurement. The remaining portion of the pump optical signal 110 passes through the beam splitter 145 and through a thin film polarizer (TFP) 150. That is, because of the polarization of the pump optical signal 110, it is able to pass through the TFP 150 and then enter the vapor cell 155.

The vapor cell 155 is a container (e.g., a tube) that contains atoms or molecules (e.g., Iodine or Rubidium) that have a well-defined absorption spectrum. At least a portion of the sides or walls of the vapor cell 155 is transparent so that optical signals can enter and leave the cell 155. Light absorption or fluorescence can be measured while changing the wavelength of the pump optical signal 110 being transmitted through the vapor cell 155 which results in a peak or a series of peaks or dips in the detected signal. At a peak, the pump optical signal 110 is absorbed by the vapor in the cell 155 while at other wavelengths, the optical signal 110 passes through the vapor cell 155 with minimal absorption.

As shown, the optical path of the probe optical signal 105 at least partially overlaps or is aligned with the optical path of the pump optical signal 110 in the vapor cell 155. To perform Modulation Transfer Spectroscopy (MTS), a control system 175 detects when the modulation on the pump optical signal 110 is transferred to the unmodulated probe optical signal 105 when passing through the vapor cell 155. When the wavelengths of the optical signals 105 and 110 are not at a peak of the absorption spectrum of the vapor in the vapor cell 155, little to none of the modulation in the pump optical signal 110 is transferred to the probe optical signal 105. However, when the wavelengths of these optical signals 105 and 110 are at a peak of the absorption spectrum, the modulation is transferred from the pump optical signal 110 to the probe optical signal 105.

After exiting the vapor cell 155, the probe optical signal is reflected by the TFP 150 to an MTS PD 170. That is, the TFP 150 reflects substantially all of the probe optical signal 105 to the MTS PD 170 so that little to none of the probe optical signal 105 passes towards the beam splitter 145. In one embodiment, the propagation direction and polarization of the pump optical signal 110 are such that no pump light is directed towards the MTS PD 170. Thus, the MTS PD 170 detects the probe optical signal 105 while the RAM PD 165 detects the pump optical signal 110.

In another embodiment, rather than directly receiving the probe optical signal 105, the MTS PD 170 detects the fluorescence of the vapor cell 155 as the probe optical signal 105 pass through. When detecting the fluorescence of the vapor cell 155 using the PD 170, the TFP 150 may be replaced with a simple polarizer since PD 170 can be located at various places along the cell and does not need to be in the beam path 105.

In this embodiment, a neutral density (ND) filter 135 (e.g., an optical attenuator) is placed in the probe optical signal 105 prior to the vapor cell 155. The ND filter provides attenuation of the pump optical signal 110 after passing through the vapor cell 155. This reduces the potential for stray reflections of the pump optical signal 110 off of the polarizer 130, probe signal 105 input optics, or other components in the system from reaching the MTS PD 170. Such reflections can cause etalons and systematic errors in the signal measured by the MTS PD 170. While ND filter 135 reduces the optical power of the probe optical signal 105 inside the vapor cell 155 as well, there is no disadvantage since the required power of the probe optical signal 105 is typically smaller than that of the pump optical signal 110. Moreover stray reflections of the pump optical signal 110 that arise after passing through the vapor cell 155 are reduced twice by the ND filter 135 while the probe optical signal 105 is only reduced once.

In one embodiment, the polarizer 130 can be a TFP or other polarization sensitive element which serves to direct the transmitted pump optical signal 110 away from the probe input optics (for example towards a beam dump, absorbing materials, or auxiliary photodiode) in order to avoid undesired pump light scatter from the polarizer 130 surface from reaching the MTS PD 170.

The electrical signals generated by the PDs 165 and 170 are provided to the control system 175 which uses these signals to generate a laser locking signal 180, a first power adjustment signal 185, an amplitude modulation correction signal 190, and a second power adjustment signal 195. The control system 175 can include hardware circuits (e.g., application specific integrated circuit(s), field programmable gate array(s), system on a chip, computing systems, controllers, etc.) software, firmware, or combinations thereof.

In one embodiment, the laser locking signal 180 is used to lock a laser frequency to a peak of the absorption spectrum of the vapor in the vapor cell 155. In one embodiment, the laser locking signal 180 is a laser adjustment signal that adjusts the wavelength of the optical source (or sources) that generates the pump optical signal 110 and the probe optical signal 105. The control system 175 can sweep the carrier frequency or wavelength of lasers until they match a peak in the absorption spectrum of the vapor in the cell 155 or the fluorescence of the vapor cell 155. To do so, the control system 175 can monitor the electrical signal generated by the MTS PD 170 which indicates the amount of modulation on the pump optical signal 110 that has transferred to the probe optical signal 105.

The control system 175 can continue to monitor the output of the MTS PD 170 to keep the carrier frequency or wavelength of the modulated pump optical signal 110 locked to the frequency corresponding to the peak in the absorption spectrum or fluorescence spectrum using the laser locking signal 180. Thus, as environmental conditions change (e.g., change in temperature, humidity, etc.) or as the optical source ages, the spectroscopy system 100 can keep the optical source (not shown) outputting a signal at the desired wavelength or frequency which matches a peak in the absorption spectrum of the vapor cell 155.

However, the embodiments herein are not limited to using the laser locking signal 180 to adjust the wavelength of the optical source (e.g., laser) generating the pump optical signal 110. The laser locking signal 180 can be used for a variety of applications including, e.g., high precision clocks, wavelength or frequency standards or gas analyzers.

In addition to using a modulation portion of the output of the MTS PD 170 to generate the laser locking signal 180, the control system 175 can also use the DC level the PD 170 outputs to generate the power adjustment signal 185 that adjusts the optical power of the probe signal 105. For example, the control system 175 may include a direct current (DC) power servo that adjusts the DC power of the probe optical signal 105 using measurements obtained from the MTS PD 170. In this manner, the control system 175 can use the output of the MTS PD 170 to perform two tasks: generate the laser locking signal 180 for performing MTS and generate the power adjustment signal 185 for the probe optical signal 105. In one embodiment, the power adjustment signal 185 may be provided to an acousto-optic modulators (AOM), variable optical attenuator (VOA), or semiconductor optical amplifier (SOA) which controls the power of the probe optical signal 105.

The control system 175 can use the output of the RAM PD 165 to generate the amplitude correction signal 190 and the second power adjustment signal 195. An undesirable amplitude modulation (e.g., RAM) may arise, for example, when modulating the frequency of the pump optical signal 110. The control system 175 can use the modulation portion of the output of the PD 165 to measure the RAM in the pump optical signal 110 and then generate the amplitude correction signal 190 to mitigate the RAM. For example, the amplitude correction signal 190 may be provided to an AOM (not shown) upstream of the input pump optical signal 110 which then mitigates the RAM.

In addition to using a modulation portion of the output of the RAM PD 165 to generate the amplitude correction signal 190, the control system 175 can also use the DC level of the PD 165's output to generate the second power adjustment signal 195 that adjusts the optical power of the pump signal 110. For example, the control system 175 may include a DC power servo that adjusts the DC power of the pump optical signal 110 using measurements obtained from the RAM PD 165. In this manner, the control system 175 can use the output of the RAM PD 165 to perform two tasks: generate the amplitude correction signal 190 for mitigating RAM and generate the second power adjustment signal 195 for the pump optical signal 110. In one embodiment, the second power adjustment signal 195 may be provided to an AOM, VOA, or SOA which controls the power of the pump optical signal 110. In situations where the probe and pump optical signals 105, 110 are generated using the same laser, the second power adjustment signal 195 can be used to adjust the power of both the probe and pump optical signals 105, 110 by adjusting a SOA in the laser. A separate VOA or AOM can then be controlled using the first power adjustment signal 185 to adjust the power of the probe optical signal 105 so that a desired power ratio between the two optical signals is achieved.

Figure 2:
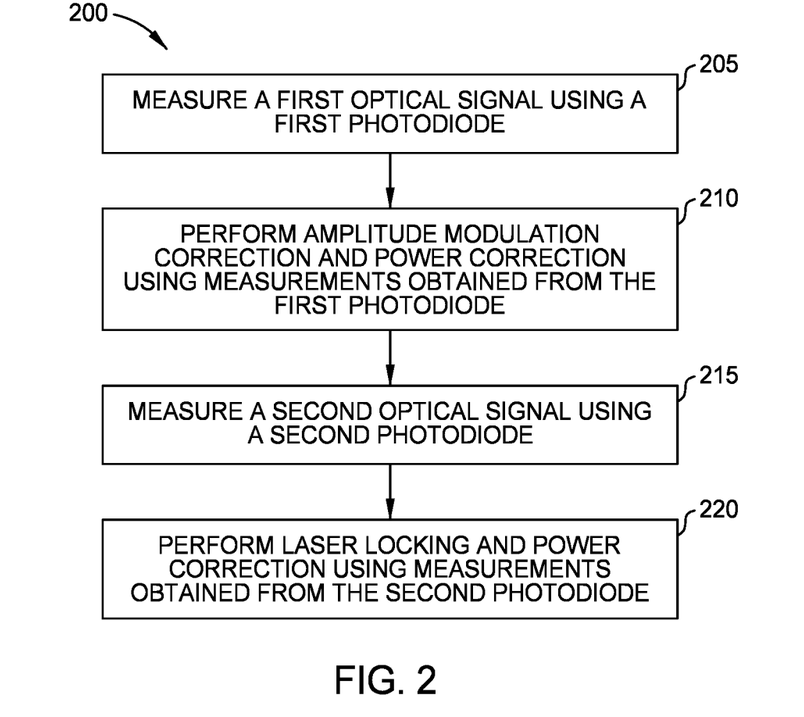
FIG. 2 is a flowchart for performing spectroscopy, according to one embodiment described herein.

FIG. 2 is a flowchart of a method 200 for performing spectroscopy, according to one embodiment described herein. At block 205, a control system (e.g., the control system 175 in FIG. 1) measures a first optical signal using a first PD. For example, the first optical signal can be the pump optical signal 110 in FIG. 1 which is measured using the RAM PD 165.

At block 210, the control system performs amplitude modulation correction and power correction using the measurement obtained from the first PD. For example, the measurements derived from the first PD can be used to generate the amplitude correction signal 190 and the power adjustment signal 195 in FIG. 1. In one embodiment, the amplitude correction signal is used by an AOM to correct for RAM in the first optical signal, while the power adjustment signal controls the DC power of an optical source that generates the first optical signal—e.g., a SOA.

At block 215, the control system measures a second optical signal using a second PD. For example, the second optical signal may be the probe optical signal 105 in FIG. 1 which is detected by the MTS PD 170.

At block 220, the control system performs laser locking and power correction using the measurements obtained from the second PD. In one embodiment, laser locking is part of an MTS-algorithm where the control system measures whether the modulation on the first optical signal (e.g., the pump optical signal) was transferred to the second optical signal (e.g., the probe optical signal) in a vapor cell. However, the embodiments herein are not limited to MTS and can be used in other types of spectroscopy.

In one embodiment, the control system uses the measurements derived from the second PD to generate a laser locking signal and a power adjustment signal. The laser locking signal can adjust the wavelength of the first and second optical signals so the control system can detect a peak of the absorption spectrum of the vapor in the vapor cell through which the optical signals pass. For example, the control system can detect when the modulation on the first optical signal is transferred to the unmodulated second optical signal as the signals pass through the vapor cell. When the wavelengths of the optical signals are not at a peak of the absorption spectrum of the vapor in the vapor cell, little to none of the modulation in the first optical signal is transferred to the second optical signal. However, when the wavelengths of these optical signals are at a peak of the absorption spectrum, the modulation is transferred from the first optical signal to the second optical signal.

The spectroscopy system can use the power adjustment signal derived from the second PD to control the power of the second optical signal. In one embodiment, the control system compares the measurements from the first and second PDs to determine whether the powers of the first and second optical signals are at the desired values, and if not, use the power adjustment signal to adjust the power of the second optical signal until the desired value is obtained.

In this manner, the method 200 describes techniques for using two PDs to perform four tasks: correcting modulation, adjusting the power of a first optical signal, performing laser locking, and adjusting the power of a second optical signal.

Figure 3:
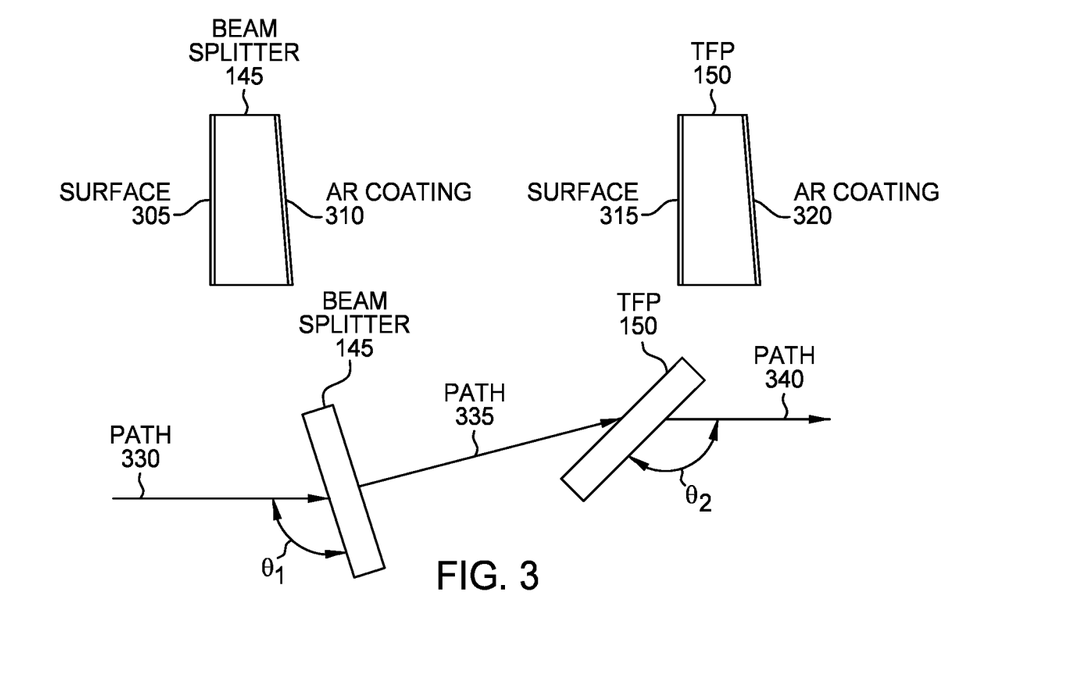
FIG. 3 illustrates optical components in an optical bench for redirecting optical signals to photodiodes, according to one embodiment described herein.

FIG. 3 illustrates optical components in an optical bench for redirecting optical signals to PDs, according to one embodiment described herein. Specifically, FIG. 3 illustrates the beam splitter 145 and the TFP 150 which are tasked with reflecting the pump optical signal 110 and the probe optical signal 105 to the PDs 165 and 170.

As shown, the beam splitter 145 has a wedge shape where a surface 305 is not parallel with an anti-reflective (AR) coating 310. Similarly, the TFP 150 also has a wedge shape where a surface 315 is not parallel with an AR coating 320. Forming the beam splitter 145 and the TFP 150 in a wedge as shown in FIG. 3 reduces etalons that degrade performance. Thus, it may be advantageous to have wedge shaped optical components.

In one embodiment, the surface 305 of the beam splitter 145 includes a non-polarizing beam splitter layer that is polarization insensitive. Further, arranging the non-polarizing beam splitter layer on the beam splitter 145, which is before the TFP 150 (relative to the optical path of the pump optical signal), reduces the number of optics the probe optical beam passes through prior to reaching the MTS PD 170. This may be advantages to reduce etalons and stray reflections.

In one embodiment, the surface 315 of the TFP 150 includes a TFP layer that is disposed on the body of the TFP 150 opposite the side containing the AR coating 320. The TFP layer can separate the probe optical signal (which has already passed through the vapor cell) from the pump optical signal, and deflect the probe optical signal to the MTS PD 170 shown in FIG. 1.

The bottom half of FIG. 3 illustrates arranging the beam splitter 145 and the TFP 150 at different angles in order to compensate for the wedge shape of each of these optical components. While the wedge shape is useful for reducing the undesirable etalons, it also deflects the optical signals in a non-parallel manner. That is, because of the wedge shape of the beam splitter 145, a path 330 of the pump optical signal is not parallel with the path 335 of the pump optical signal after being transmitted through the beam splitter 145. However, this deflection between the paths 330 and 335 can be compensated for or removed by appropriate selection of wedge angles and the optics angles (i.e., $\Theta_1$ and $\Theta_2$). As a result, the path 340 of the pump optical signal when exiting the TFP 150 is parallel with the path 330.

FIG. 3, however, illustrates just one possible arrangement of the beam splitter 145 and the TFP 150 to compensate for the deflection caused by using wedge shaped optical components. In general, the beam splitter 145 and the TFP 150 can have any arrangement where the deflection caused by the pump optical signal passing through the wedge shape of the beam splitter 145 is compensated for by the TFP 150 such that a direction of propagation of the pump optical signal when entering the beam splitter 145 is parallel with a direction of propagation of the pump optical signal when exiting the TFP 150.

Figure 4A:
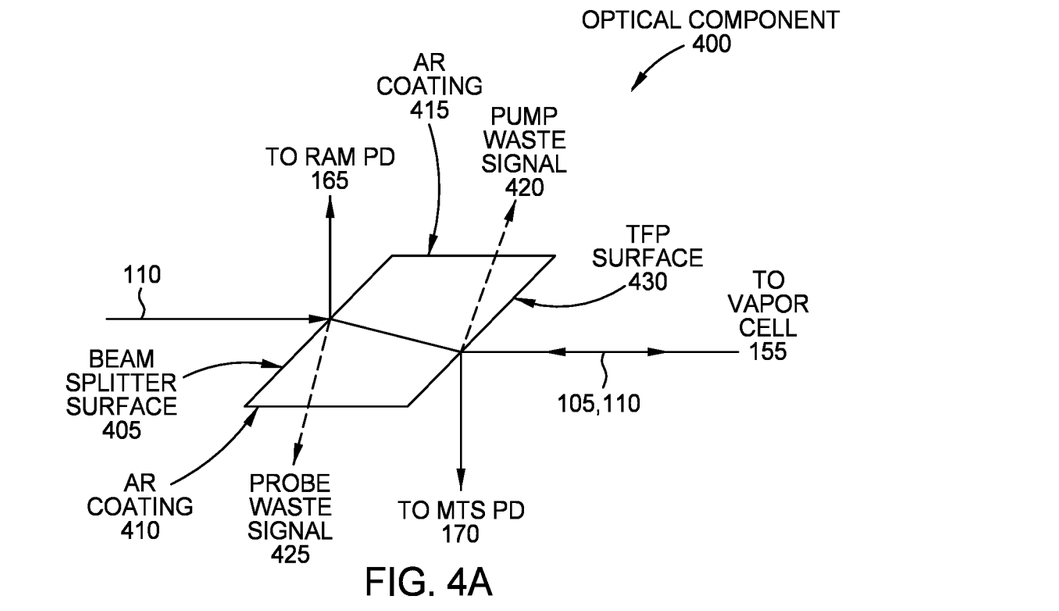
FIGS. 4A-4C illustrate optical components in an optical bench for redirecting optical signals to photodiodes, according to one embodiment described herein.
Figure 4B:
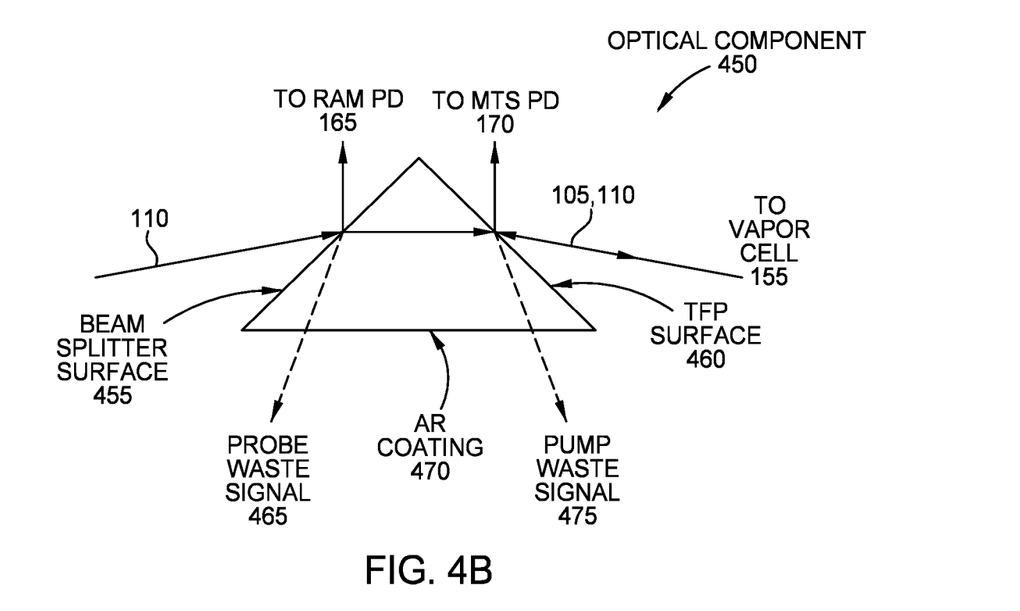
Figure 4C:
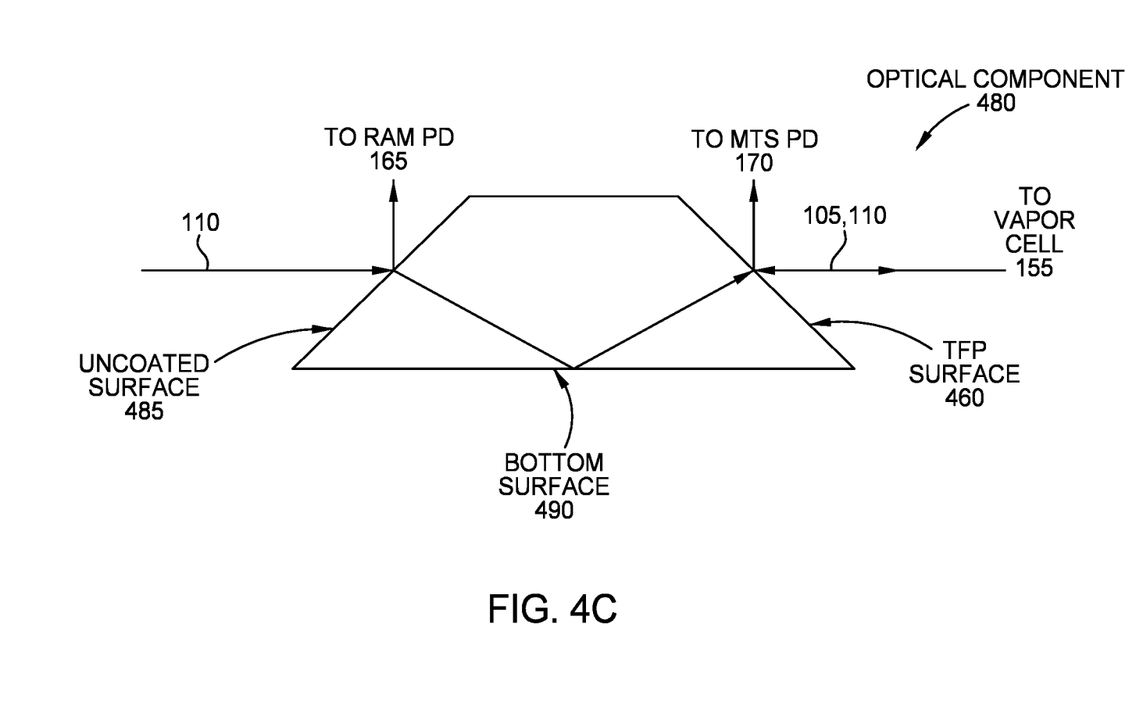

FIGS. 4A-4C illustrate optical components in an optical bench for redirecting optical signals to PDs, according to one embodiment described herein. Specifically, FIGS. 4A-4C illustrates using a unitary or integrated optical component to reflect the pump and probe optical signals to PDs, rather than using separate optical components as shown in FIGS. 1 and 3. Put differently, the beam splitter 145 and the TFP 150 in FIG. 1 can be replaced by one of the optical components illustrated in FIGS. 4A-4C.

FIG. 4A illustrates a unitary optical component that includes a beam splitter surface 405 and a TFP surface 430 (e.g., one example of a polarizer surface) disposed on opposite sides of a single optic. The pump optical signal enters at the beam splitter surface 405 (which can be uncoated or a non-polarizing beam splitter coating). Some of the power of the pump optical signal is reflected by the beam splitter surface 405 and is detected by the RAM PD 165 as discussed above. The remaining portion of the pump optical signal passes through the component 400 and then exits at the TFP surface 430. However, a portion of the pump optical signal is reflected at the TFP surface 430 and is labeled as the pump waste signal 420 (e.g., a waste beam) and exits the optical component 400 at the top side which has an AR coating 415.

In one embodiment, the width (in the X direction) of the optical component 400 is sufficiently large enough so that the pump waste signal 420 can exit at an AR coated surface 415. Otherwise, the pump waste signal 420 may continue to reflect in the optical component 400 and cause diffuse scatter or glow which can be detected by the PD 165 or PD 170, which is generally undesirable.

After passing through the vapor cell, the probe optical signal 105 reaches the TFP surface 430 which reflects most of the signal to the MTS PD 170. However, a portion of the probe optical signal 105 can pass through the surface 430, reach the beam splitter surface 405 and is reflected downwards before exiting the component 400 at the bottom side with an AR coating 410. This is labeled as the probe waste signal 425. Like with the pump waste signal 420, the width or thickness of the optical component 400 can be set so that these waste signals can exit at sides with the AR coatings 410 and 415 to prevent these signals from continuing to reflect in the optical component 400, which can cause the component 400 to glow and be detected by the PDs 165 and 170.

FIG. 4B illustrates a unitary optical component 450 that includes a beam splitter surface 455 and TFP surface 460 disposed on opposite sides. The pump optical signal enters at the beam splitter surface 455 (which may be uncoated or non-polarizing beam splitter coating). Some of the power of the pump optical signal is reflected by the beam splitter surface 455 and is detected by the RAM PD 165 as discussed above. The remaining portion of the pump optical signal passes through the component 450 and then exits at the TFP surface 460. However, a portion of the pump optical signal is reflected at the TFP surface 460 and is labeled as the pump waste signal 475 and exits the optical component 450 at the bottom side which has an AR coating 470.

After passing through the vapor cell, the probe optical signal 105 reaches the TFP surface 460 which reflects most of the signal to the MTS PD 170. However, a portion of the probe optical signal 105 can pass through the surface 460, reach the beam splitter surface 455, and be reflected downwards before exiting the component 450 at the bottom side with the AR coating 470. This is labeled as the probe waste signal 465. Like with the component 400 in FIG. 4A, the width or thickness of the optical component 450 in FIG. 4B can be set so that these waste signals (e.g., waste beams) exit at a side with an AR coating 470 to prevent these signals from continuing to reflect in the optical component 450, which can cause the component 450 to glow and be detected by the PDs 165 and 170.

FIG. 4C illustrates a unitary optical component 480 that includes an uncoated surface 485 and TFP surface 460 disposed on opposite sides. The body of the component 480 has the shape of a dove prism, but other shapes are possible.

The pump optical signal 110 enters at the uncoated surface 485. Some of the power of the pump optical signal 110 is reflected by the uncoated surface 485 and is detected by the RAM PD 165 as discussed above. The remaining portion of the pump optical signal 110 passes through the body of the component 480, reflects off a bottom surface 490, and then exits at the TFP surface 460 where it is directed to the vapor cell 155. In one embodiment, there is total internal reflection when the pump optical signal 110 reflects off the bottom surface 490. In one embodiment the uncoated surface 485 is replaced by a non-polarizing beam splitter coating.

After passing through the vapor cell 155, the probe optical signal 105 reaches the TFP surface 460 which reflects the signal to the MTS PD 170, similar to what was discussed above.

The bodies of the components 400, 450, and 480, which define the shapes of these components, can include a transparent material such as glass. In these examples, the body of the optical component 400 forms a parallelogram or parallelepiped while the body of the optical components 450 and 480 form a triangle or prism.

Moreover, a portion or the entire bottom surface 490 of the optical component 480 can have an AR coating to permit waste signals to pass therethrough. That is, waste signals may pass from the uncoated surface 485 and the TFP surface 460 and exit the optical component 480 via the bottom surface 490.

Figure 5A:
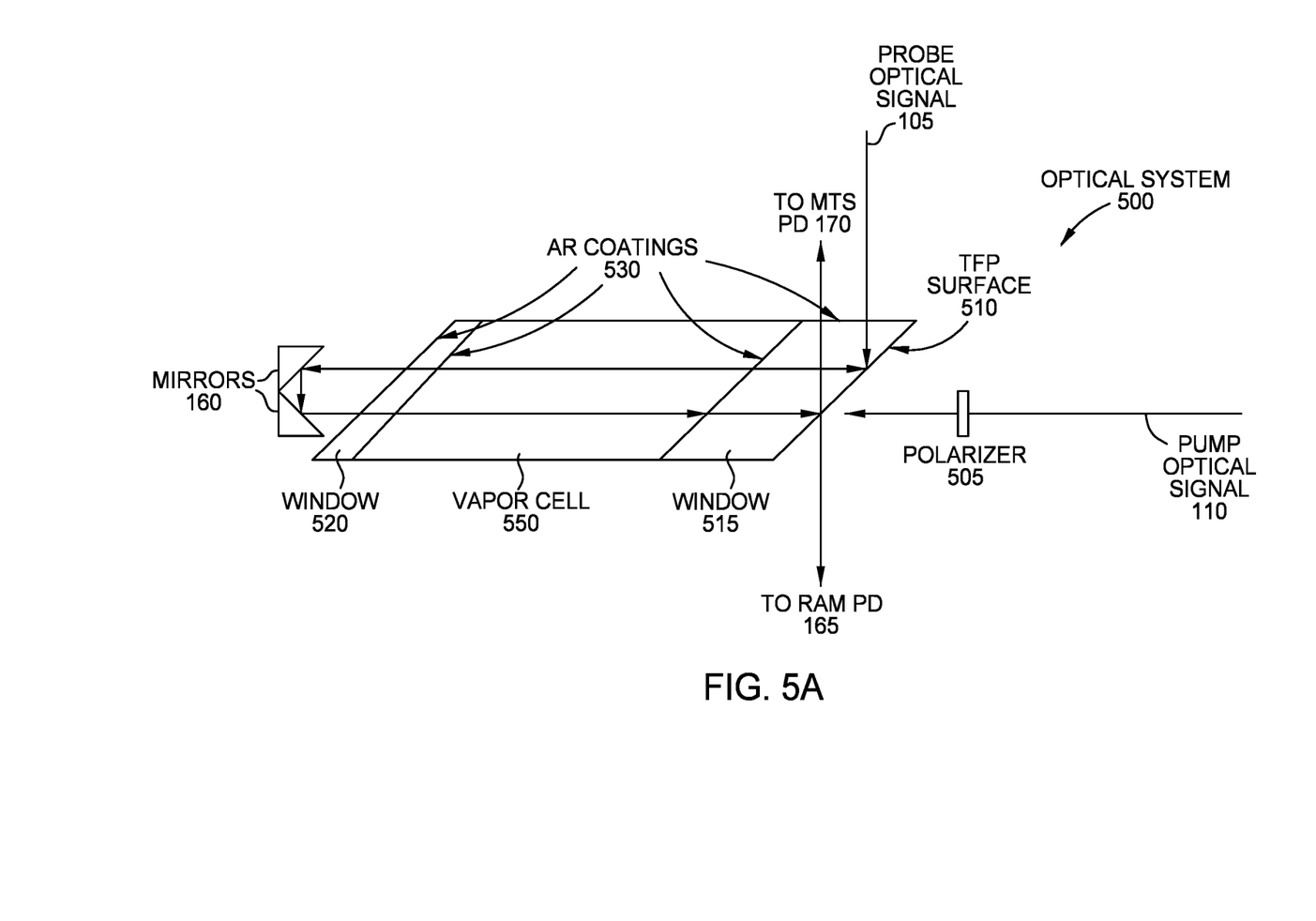
FIGS. 5A and 5B illustrate integrating a vapor cell with an optical component for redirecting optical signals to photodiodes, according to one embodiment described herein.

FIG. 5A illustrates integrating a vapor cell with an optical component for redirecting optical signals to PDs, according to one embodiment described herein. In one embodiment, the optical system 500 in FIG. 5A can be used to replace the beam splitter 145, TFP 150, and vapor cell 155 in FIG. 1. Stated differently, the optical components in FIG. 5A can perform the same function as the beam splitter 145, TFP 150, and vapor cell 155 in FIG. 1.

The probe optical signal 105 and pump optical signal 110 are shown at the right of the figure. For example, the probe optical signal 105 may have already passed through the polarizer 130 and the ND filter 135 shown in FIG. 1. The pump optical signal 110 may have already passed through the polarizer 125 in FIG. 1. In addition, the pump optical signal 110 passes through a polarizer 505 which alters the polarization of the pump optical signal 110. As a result, a TFP surface 510 reflects a portion of the pump optical signal 110 down towards the RAM PD 165 while the remaining portion of the signal 110 enters an optical window 515 of the vapor cell 550.

As shown, the vapor cell 550 includes windows 515 and 520, which have a wedge shape, on opposite ends where the probe and pump optical signals 105, 110 enter and exit the vapor cell 550. Although not shown in FIG. 1, the vapor cell 155 may also include optical windows at its ends. However, in FIG. 5A, the window 515 is modified to perform the functions of the beam splitter 145 and the TFP 150 in FIG. 1. For example, the window 515 may be thicker (or wider) than the window on the vapor cell 155 in FIG. 1. Further, the window 515 includes the TFP surface 510 for reflecting a portion of the pump optical signal 110 to the RAM PD 165 and reflecting the probe optical signal 105 (after passing through the vapor cell 550) from the TFP surface 510. Further, the window 515 includes an AR coating 530 on the top side to permit the reflected probe optical signal 105 to pass through the window 515 and reach the PD 170. This AR coating 530 also provides an interface for the probe optical signal 105 to enter the window 515.

Thus, FIG. 5A illustrates an optical system 500 where a window 515 of the vapor cell 550 can be modified to replace the beam splitter 145 and the TFP 150 in FIG. 1 (or the unitary optical components 400, 450, and 480 in FIGS. 4A-4C).

In one embodiment, the AR coatings 530 are applied to the windows 515 and 520 before they are attached to the vapor cell 550. In one embodiment, the coating or film used to form the TFP surface 510 can be added after the cell 550 is fabricated to avoid exposure to a high temperature process while sealing the vapor cell 550.

While FIG. 5A illustrates mirrors 160 disposed to the left of the window 520, in other embodiments, a high reflection (HR) mirror can be added to the left side of the window 520 for reflecting the optical signals. For example, the probe and pump optical signals 105, 110 can be directed into the vapor cell 550 at an angle and then reflect off the HR mirror of the window 520. Doing so removes extra components (e.g., the mirrors 160) and simplifies the overall system.

Figure 5B:
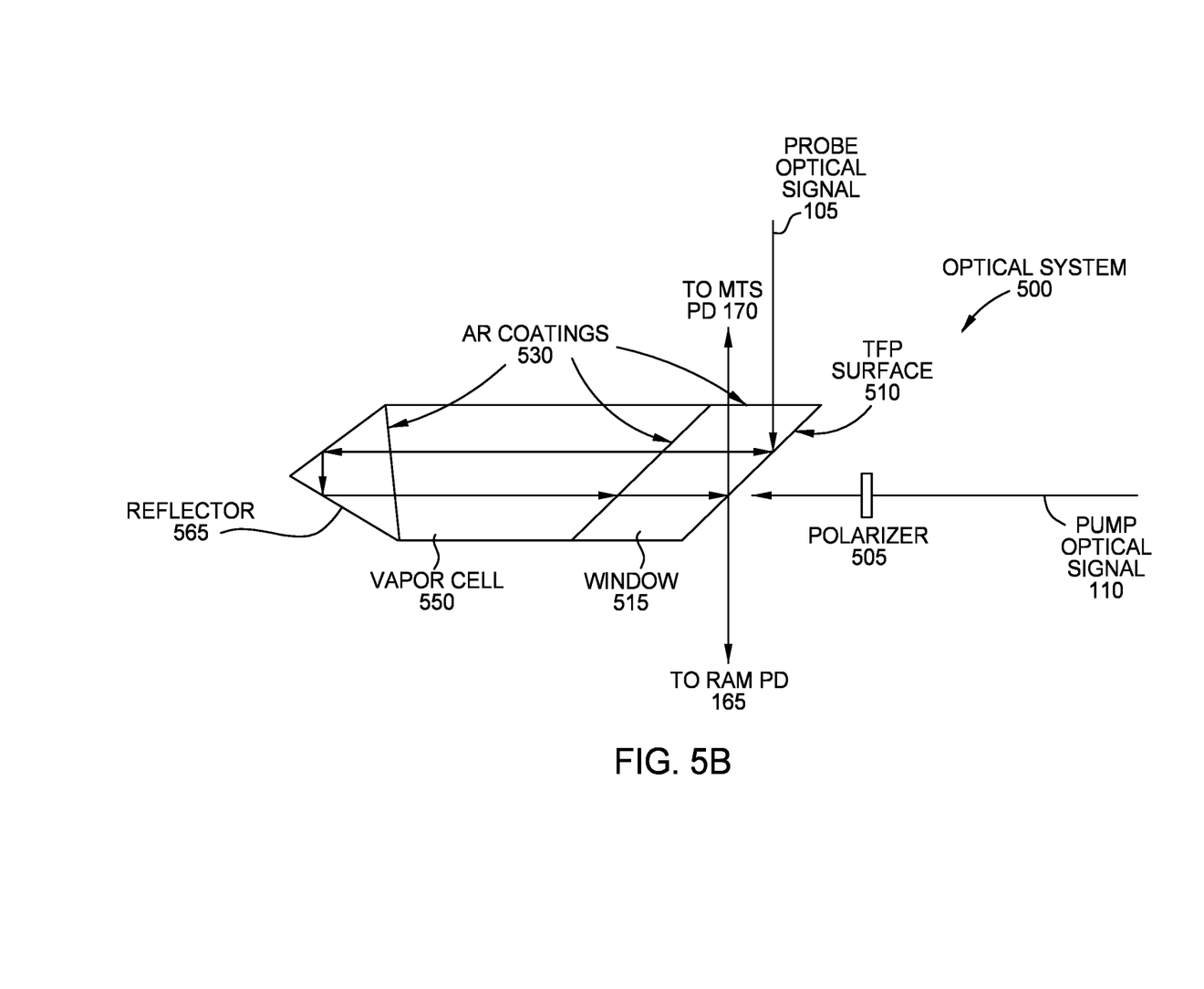

FIG. 5B illustrates another embodiment where the mirrors 160 in FIG. 5A can be omitted. In optical system 560, the second cell window 520 and mirrors 160 depicted in FIG. 5A can be replaced with a single reflector 565. The reflector 565 can perform the same function as the window 520 and mirrors 160 serving as both the vapor cell seal and beam steering to enable the probe and pump optical signals 105, 110 to pass multiple times through the vapor cell.

In one embodiment, the reflector 565 is a glass prism configured for total internal reflection, such as a roof prism, allowing a similar function to the mirrors 160 in FIG. 5A. In this case, the beam alignment occurs in such a manner that the probe optical signal 105 and pump optical signal 110 pass through fewer optical surfaces in the system which is advantageous to reduce etalons, diffuse scatter, and system complexity. In another embodiment the surfaces of the reflector 565 have a thin film or dielectric coating to perform the mirror function.

In one embodiment the reflector 565 reduces undesired reflections and etalons in the optical system 560 by including an AR coated surface 530 on the reflector input side facing the vapor cell 550 and by tilting the reflector 565 to avoid normal incidence.

Figure 6:
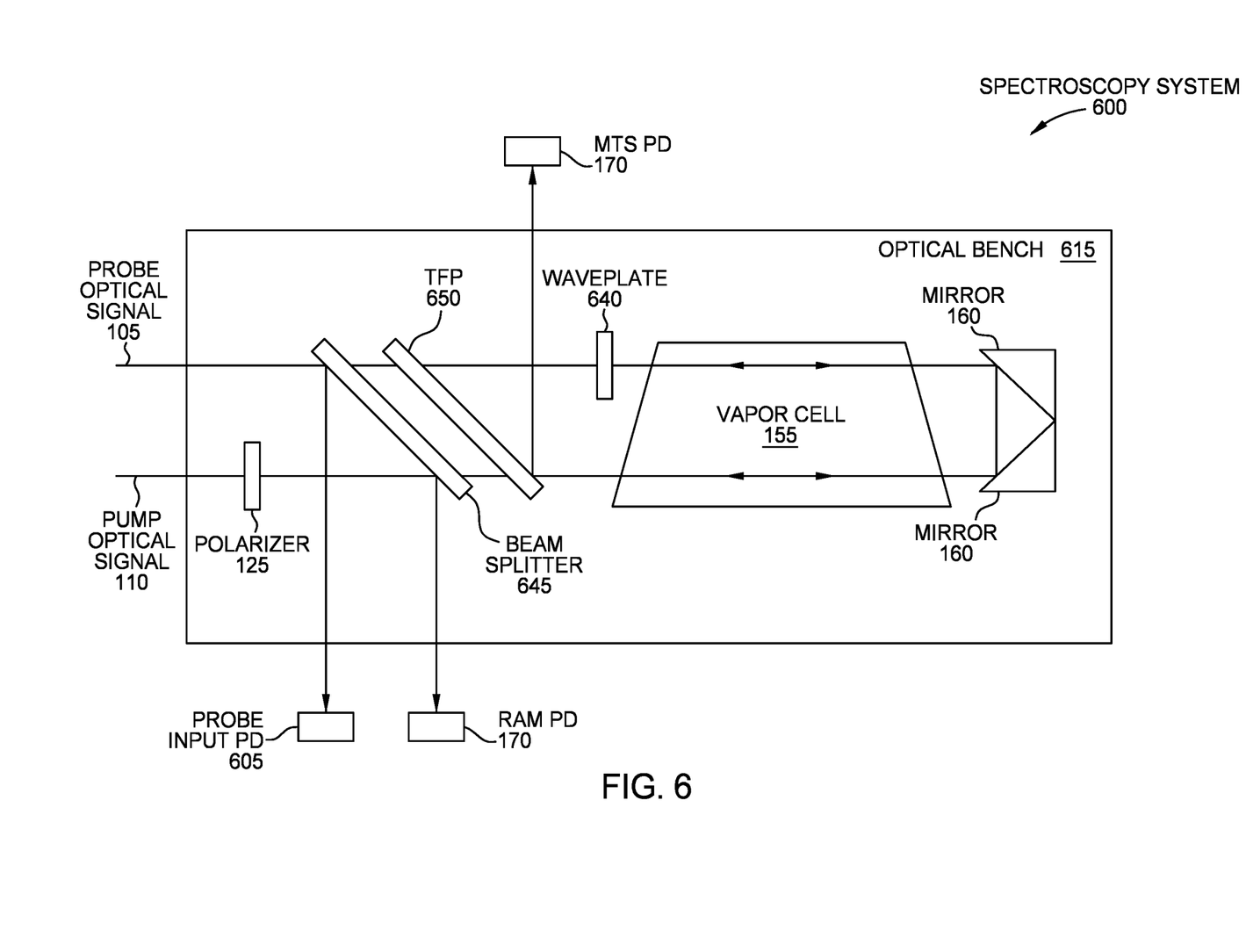
FIG. 6 illustrates a spectroscopy system with an optical bench, according to one embodiment described herein.

FIG. 6 illustrates a spectroscopy system 600 with an optical bench 615, according to one embodiment described herein. In this example, the optical bench 615 includes many of the same components as the optical bench 115 in FIG. 1, which are indicated by using the same reference numbers. However, unlike in FIG. 1, the optical bench 615 includes a beam splitter 645 and TFP 650 which both the probe optical signal 105 and pump optical signal 110 pass through, along with a waveplate 640. Passing both optical signals through the same beam splitter and TFP can allow for more compact geometries and reduce complexity.

The beam splitter 645 crosses the optical path of both the probe and pump optical signals 105, 110. Doing so results in the beam splitter 645 reflecting a portion of the probe optical signal 105 to an optional probe input PD 605. Though not required, the output of the probe input PD 605 can be provided to the control system (not shown) to monitor and adjust the power of the probe optical signal 105, monitor the probe power control performance in an out-of-loop manner, or suppress residual intensity noise (RIN) on the probe optical signal.

Due to miniaturization, or because the spacing between the pump and probe optical signals has been reduced, FIG. 6 illustrates that the TFP 650 can also be in the path of the probe optical signal 105 before this signal reaches the vapor cell 155. Moreover, the TFP 650 is also in the path of the probe optical signal 105 after it passes through the vapor cell 155. As such, the TFP 650 can perform the function discussed above where it reflects the probe optical signal 105 to the MTS PD 170.

In sum, the optical bench 615 allows additional measurements to be captured (e.g., the measurement obtained using the probe input PD 605) and a smaller optical bench 615, without adding any additional components to the optical bench 615. Although not shown, FIG. 6 can also include a ND filter which is disposed between, e.g., the TFP 650 and the waveplate 640.

Figure 7:
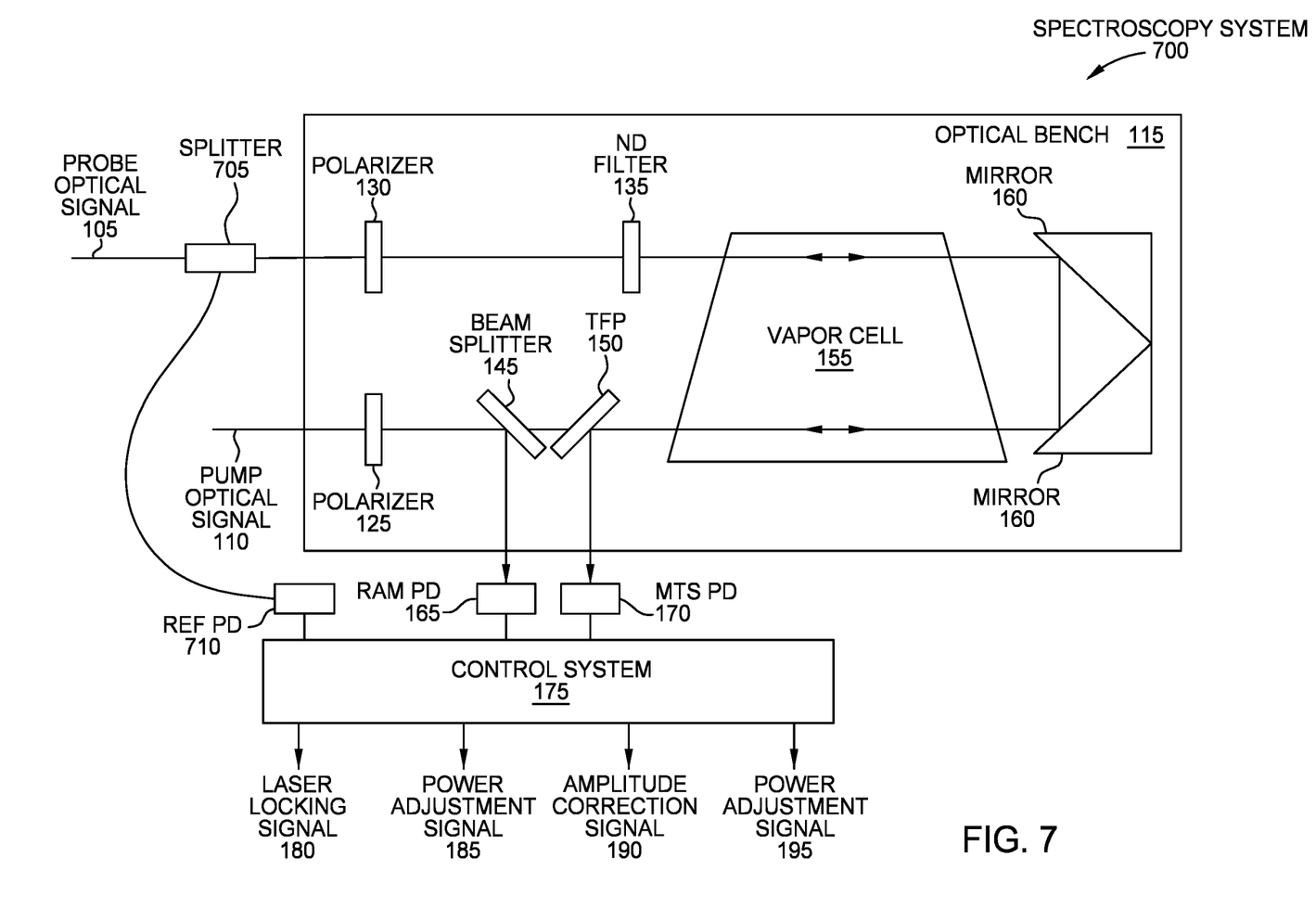
FIG. 7 illustrates a spectroscopy system with an optical bench, according to one embodiment described herein.

FIG. 7 illustrates a spectroscopy system with an optical bench 115, according to one embodiment described herein. The optical bench 115 in FIG. 7 is the same as the optical bench 115 in FIG. 1, and can have any of the alternative arrangements discussed above. In addition to having the optical bench 115, the system 700 includes a splitter 705 that splits the power in the probe optical signal 105 so that a portion of this signal 105 is transmitted to a reference PD 710. The output of the reference PD 710 is coupled to the control system 175 and can be used to reduce noise in the probe optical signal 105.

In one embodiment, the optical source used to generate the probe optical signal 105 can have significant residual intensity noise (RIN) in a frequency band of interest. To suppress the impact of RIN, a reference PD 710 can be used in combination with the control system 175 and MTS PD 170. This system could also be useful in the optical systems illustrated in FIGS. 1 and 6.

Moreover, the embodiments described above can be applied to spectroscopy systems that use an unmodulated reference optical signal to mitigate noise. In those embodiments, the unmodulated reference optical signal is transmitted through the same vapor cell as the modulated pump optical signal and the probe optical signal as discussed above. Examples of this are described in NOISE MITIGATION IN VAPOR CELL SPECTROSCOPY, U.S. patent application Ser. No. 17/933,735, which is hereby incorporated by reference.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A spectroscopy system, comprising:
    a vapor cell configured to receive a probe optical signal and a pump optical signal, wherein optical paths of the probe and pump optical signal in the vapor cell at least partially overlap, wherein the probe optical signal is an unmodulated optical signal before entering the vapor cell, wherein the pump optical signal is a modulated optical signal;
    a first photodiode configured to receive a portion of the pump optical signal before passing through the vapor cell;
    a second photodiode configured to at least one of (i) receive a portion of the probe optical signal after passing through the vapor cell or (ii) detect a fluorescence of the vapor cell; and
    a control system configured to:
        perform amplitude correction and power adjustment on the pump optical signal using measurements obtained from the first photodiode, and
        perform power adjustment on the probe optical signal and laser locking using measurements obtained from the second photodiode.

2. The spectroscopy system of claim 1, further comprising:
    a beam splitter surface configured to reflect a portion of the pump optical signal to the first photodiode and transmit the remaining portion of the pump optical signal to the vapor cell; and
    a polarizer surface configured to receive the probe optical signal after passing through the vapor cell and reflect the probe optical signal to the second photodiode, wherein the remaining portion of the pump optical signal passes through the polarizer surface before reaching the vapor cell.

3. The spectroscopy system of claim 2, wherein the beam splitter surface is disposed on a first wedge shaped optical component and the polarizer surface is a thin film polarizer (TFP) disposed on a second wedge shaped optical component.

4. The spectroscopy system of claim 3, wherein a deflection on the pump optical signal caused by passing through the wedge shape of the first wedge shaped optical component is compensated for by the second wedge shaped optical component such that a direction of propagation of the pump optical signal when entering the first wedge shaped optical component is parallel with a direction of propagation of the pump optical signal when exiting the second wedge shaped optical component.

5. The spectroscopy system of claim 2, wherein the beam splitter surface and the polarizer surface are disposed on opposite sides of a unitary optical component having a shape of a parallelepiped, wherein the unitary optical component comprises respective anti-reflective (AR) coatings through which waste beams corresponding to the probe and pump optical signals pass when exiting the unitary optical component.

6. The spectroscopy system of claim 2, wherein the beam splitter surface and the polarizer surface are disposed on opposite sides of a unitary optical component having a shape of a prism, wherein the unitary optical component comprises an AR coating through which waste beams corresponding to the probe and pump optical signals pass when exiting the unitary optical component.

7. The spectroscopy system of claim 2, wherein the beam splitter surface and the polarizer surface are disposed on opposite sides of a unitary optical component having a shape of a dove prism.

8. The spectroscopy system of claim 2, wherein the beam splitter surface is disposed on a first optical component and the polarizer surface is a thin film polarizer (TFP) disposed on a second optical component,
wherein at least a portion of the probe optical signal passes through both the first and second optical components before reaching the vapor cell,
wherein at least a portion of the pump optical signal passes through both the first and second optical components before reaching the vapor cell.

9. The spectroscopy system of claim 1, further comprising:
a window contacting the vapor cell and arranged to receive the pump and probe optical signals, wherein the window comprises a polarizer surface that reflects the portion of the pump optical signal to the first photodiode and reflects the portion of the probe optical signal to the second photodiode.

10. The spectroscopy system of claim 9, wherein the window comprises an AR coating through which one of the reflected portions of the pump or probe optical signal passes before reaching the first or second photodiode.

11. The spectroscopy system of claim 10, further comprising:
a reflector disposed on a side of the vapor cell opposite the window, the reflector configured to seal the vapor cell and enable the pump and probe optical signals to pass multiple times through the vapor cell.

12. The spectroscopy system of claim 1, further comprising:
an optical attenuator configured to attenuate the pump optical signal after passing through the vapor cell and attenuate the probe optical signal before passing through the vapor cell.

13. A spectroscopy system, comprising:
a vapor cell configured to receive a probe optical signal and a pump optical signal, wherein optical paths of the probe and pump optical signal in the vapor cell at least partially overlap;
a first photodiode configured to receive a portion of the pump optical signal before passing through the vapor cell;
a second photodiode configured to at least one of (i) receive a first portion of the probe optical signal after passing through the vapor cell or (ii) detect a fluorescence of the vapor cell;
a third photodiode configured to receive a second portion of the probe optical signal before passing through the vapor cell; and
a control system configured to:
perform amplitude correction and power adjustment on the pump optical signal using measurements obtained from the first photodiode;
perform laser locking using measurements obtained from the second photodiode; and
reduce noise on the probe optical signal using measurements obtained from the third photodiode.

14. The spectroscopy system of claim 13, further comprising:
a beam splitter surface configured to reflect a portion of the pump optical signal to the first photodiode and transmit the remaining portion of the pump optical signal to the vapor cell; and
a polarizer surface configured to receive the probe optical signal after passing through the vapor cell and reflect the probe optical signal to the second photodiode, wherein the remaining portion of the pump optical signal passes through the polarizer surface before reaching the vapor cell.

15. The spectroscopy system of claim 14, wherein the beam splitter surface is disposed on a first wedge shaped optical component and the polarizer surface is a thin film polarizer (TFP) disposed on a second wedge shaped optical component.

16. The spectroscopy system of claim 15, wherein a deflection on the pump optical signal caused by passing through the wedge shape of the first wedge shaped optical component is compensated for by the second wedge shaped optical component such that a direction of propagation of the pump optical signal when entering the first wedge shaped optical component is parallel with a direction of propagation of the pump optical signal when exiting the second wedge shaped optical component.

17. The spectroscopy system of claim 14, wherein the beam splitter surface and the polarizer surface are disposed on opposite sides of a unitary optical component having a shape of a parallelepiped, wherein the unitary optical component comprises respective AR coatings through which waste beams corresponding to the probe and pump optical signals pass when exiting the unitary optical component.

18. The spectroscopy system of claim 14, wherein the beam splitter surface and the polarizer surface are disposed on opposite sides of a unitary optical component having a shape of a prism, wherein the unitary optical component comprises an AR coating through which waste beams corresponding to the probe and pump optical signals pass when exiting the unitary optical component.

19. The spectroscopy system of claim 14, wherein the beam splitter surface and the polarizer surface are disposed on opposite sides of a unitary optical component having a shape of a dove prism.

20. The spectroscopy system of claim 14, wherein the beam splitter surface is disposed on a first optical component and the polarizer surface is a TFP disposed on a second optical component,
wherein at least a portion of the probe optical signal passes through both the first and second optical components before reaching the vapor cell,
wherein at least a portion of the pump optical signal passes through both the first and second optical components before reaching the vapor cell.

21. The spectroscopy system of claim 13, further comprising:
a window contacting the vapor cell and arranged to receive the pump and probe optical signals, wherein the window comprises a polarizer surface that reflects the portion of the pump optical signal to the first photodiode and reflects the first portion of the probe optical signal to the second photodiode.

22. The spectroscopy system of claim 21, wherein the window comprises an AR coating through which one of the reflected portions of the pump or probe optical signal passes before reaching the first or second photodiode.

23. A method, comprising:
measuring a pump optical signal using a first photodiode before the pump optical signal has passed through a vapor cell, wherein the pump optical signal is a modulated optical signal;
performing amplitude modulation correction and power adjustment on the pump optical signal using measurements obtained from the first photodiode;
at least one of (i) measuring a probe optical signal or (ii) detecting a fluorescence of the vapor cell using a second photodiode after the probe optical signal has passed through the vapor cell, wherein the probe optical signal is an unmodulated optical signal before entering the vapor cell; and
performing power adjustment on the probe optical signal and laser locking using measurements obtained from the second photodiode.

* * * * *